United States Patent [19]
Mallet

[11] Patent Number: 5,563,336
[45] Date of Patent: Oct. 8, 1996

[54] APPPARATUS FOR PRESSURE TESTING OF TUBULARS

[76] Inventor: Ronald J. Mallet, 5218 Monceaux Rd., Rayne, La. 70578

[21] Appl. No.: 527,742

[22] Filed: Sep. 13, 1995

[51] Int. Cl.⁶ ................................................ G01M 3/08
[52] U.S. Cl. ............................................ 73/49.1; 73/40.7
[58] Field of Search .......................... 73/40.5 P, 40.5 R, 73/46, 49.1, 49.5, 49.6, 49.8; 138/90, 93

[56] References Cited

U.S. PATENT DOCUMENTS

| | | | |
|---|---|---|---|
| 3,154,940 | 11/1964 | Loomis | 73/40.5 |
| 3,165,918 | 1/1965 | Loomis | 73/40.5 |
| 3,165,919 | 1/1965 | Loomis | 73/40.5 |
| 3,165,920 | 1/1965 | Loomis | 73/40.5 |
| 3,199,598 | 8/1965 | Loomis | 166/147 |
| 3,712,115 | 1/1973 | Miller | 73/49.1 |
| 4,083,230 | 4/1978 | Rome et al. | 73/40.5 R |
| 4,192,177 | 3/1980 | Crickard et al. | 73/49.5 |
| 4,733,554 | 3/1988 | Lazes | 73/46 |
| 4,763,511 | 8/1988 | Mathison et al. | 73/49.1 |
| 4,852,393 | 8/1989 | Pate et al. | 73/49.5 |
| 5,377,530 | 1/1995 | Allen et al. | 73/49.5 R |

*Primary Examiner*—Hezron E. Williams
*Assistant Examiner*—Jay L. Politzer
*Attorney, Agent, or Firm*—Jesse D. Lambert

[57] ABSTRACT

An apparatus for pressure testing of tubulars. The apparatus comprises a tester body having multiple spaced-apart external circumferential seal elements expansible by piston movement; a seal gas saver valve connected to the tester body; and a pressurized seal and test gas source to supply gas to the tester. The tester body is inserted into a tubular so that the seal elements are astride a desired test area, typically a tubular connection. Seal gas pressure is then applied to move the pistons and expand the seal elements against the tubular wall, forming a test chamber. Test gas is then introduced into the chamber to achieve a desired pressure, and external containment and sensing means are used to detect any escape of test gas, thereby showing a leak. When the test is complete, the test gas pressure is released, and the seal gas pressure is reduced, with the seal gas flowing back into a reclamation tank. When a desired seal gas retention pressure is reached, the seal gas saver valve closes, maintaining the pressure in the seal gas supply line and venting the small remaining seal gas volume in the tester body. Damage to the tester seal elements by excessive piston travel is prevented by positive piston stop means on the tool.

9 Claims, 4 Drawing Sheets

APPPARATUS FOR PRESSURE TESTING OF TUBULARS

BACKGROUND OF THE INVENTION

1. Field of the Invention

The present invention relates to a means of testing the pressure integrity of tubulars, as commonly but not exclusively used in oil and gas wells to convey produced formation fluids from a subsurface producing formation to the surface. More particularly, the present invention relates to a means to internally test the pressure integrity of a tubing connection by forming an internal test chamber adjacent to the connection and pressuring the chamber to a desired test pressure. The test chamber is formed by inserting a generally cylindrical tester body having multiple spaced-apart external circumferential seal elements into the tubular, and positioned with at least one seal element above the connection and at least one seal element below the connection. A seal gas supply line supplies seal gas pressure to pistons on the tester body which move and expand the seal elements against the tubular wall, thereby creating a test chamber defined by the upper and lower seal elements, the tester tool body, and the tubular wall. Then, a test gas is introduced into the test chamber until a desired test pressure is achieved. A sensing means is employed on the exterior of the tubular adjacent to the internal test chamber to capture and detect any escape of test fluid from the tubular, showing a leak thereby.

More particularly, the invention relates to a means for maintaining the seal gas supply line at a desired pressure between tests to avoid lengthy re-pressuring of the relatively large line volume for each test, saving overall testing time. In addition, the apparatus provides a means for retaining and recycling a substantial part of the seal gas thereby greatly reducing the required volume and cost of the expensive gas. Further still, the invention provides a means to positively prevent excessive seal piston travel and resulting damage to the tester body seal elements.

2. Description of the Prior Art

Tubular piping of all types is commonly used in industrial applications to transfer fluids from one point to another. In particular in the oil and gas industry, tubular goods, commonly referred to as tubing strings, measuring many of thousands of feet in length are employed in oil and gas wells to convey produced fluids, namely oil and natural gas, from a subsurface producing formation to the surface. The tubing string runs within a larger diameter tubular known as casing which supports and seals the wellbore wall. Oil and gas are typically encountered at high pressures, and therefore pressure integrity of the tubing string is of utmost importance. Leaks in the tubing string, permitting oil and natural gas to escape from the tubing string into the tubing/casing annulus, create a highly dangerous situation with the possibility of pollution, loss of natural resources, and injury to personnel, since oil and gas are highly flammable.

The increasing scarcity of shallow, easily producible formations has driven the oil and gas industry toward progressively deeper producing intervals where much higher formation pressures are usually encountered. Also, as the more desirable formations with relatively non-corrosive formation fluids become scarcer, oil and natural gas are increasingly produced which contain various corrosive components, such as hydrogen sulfide. These corrosive fluids attack metals; while the tubing strings used in such situations may be internally coated to combat corrosion, or made of corrosion-resistant alloys, the casing string is often not corrosion resistant due to the high cost of such materials. The hostile producing environments of high pressure and corrosive fluids make pressure integrity of the tubing strings ever more important. In addition, tremendous capital expenditures are being made on oil and gas exploration and production ventures in offshore waters in water depths now measured in thousands of feet. The cost to install tubing strings in oil and gas wells in these water depths is extremely high, and it is of critical importance to test tubular strings so as to ensure the highest possible pressure integrity.

Ensuring pressure integrity of tubular connections comprises two primary actions: first, proper techniques to make up the (typically) threaded connections joining joints of tubing; and second, testing the connections after they are made up to verify that, at least at that time, the connections are truly pressure-tight.

Devices and methods to test the pressure integrity of tubular connections used in oil and gas wells have existed in various forms for some time. Testing methods generally comprise inserting an elongated tester body having multiple external circumferential seal elements into a tubular. The seal elements are then expanded against the inner wall of the tubular, forming a pressure seal. In this manner, a test chamber is created, defined by the inner tubular wall, upper and lower seal elements, and the tester body. A test fluid is introduced into this test chamber to achieve a desired test pressure. Any leaks in the connection are then determined by detecting escape of the test fluid. In earlier test apparatus, the test fluid was typically water, used primarily for cost and ease of leak detection with the relatively crude detection methods then available. Water being generally readily available, the cost is low. Earlier leak detection comprised monitoring the test for a pressure drop, and a leak in a water-filled chamber causes a relatively large and easily detectible pressure drop in the test chamber since water is relatively incompressible.

However, a disadvantage to using water as a test fluid lies in the integrity of the resulting test. Monitoring pressures to determine leaks with water reveals only relatively large leaks, and small leak paths that may not permit water to flow through, and thus not show up as a leak, may permit lower viscosity liquids (such as oil) or gas to flow through. Thus, a tubular connection which does not leak when tested with water may leak when other fluids are applied to it under pressure. Test integrity is highest when a gaseous test fluid is used, in particular one with a low molecular weight such as helium, since the test gas will leak through very small leak paths. Although gas testing yields the highest quality pressure test, gas testing is costly for two primary reasons: test time, largely due to the time to re-pressure the test and seal gas volumes between connection tests; and cost of the noble gas (such as helium) vented from the tool and lines upon depressurization, such gases being a relatively scarce and expensive natural resource.

Due to gas compressibility, leak detection by monitoring pressure in the test chamber is not a sufficiently accurate means to detect small leaks. For this reason, alternative means for detecting the escape of the test gas have been developed. Commonly, a noble gas such as helium is used as a test gas, which is readily detectable in very small concentrations by a mass spectrometer. A sleeve-type means is used to surround the exterior of the tubular adjacent the test chamber and to capture any escaped test gas, and then to sense the presence of any escaped test gas with a mass spectrometer.

Test integrity is best preserved by completely avoiding any liquid in the test apparatus, using gas for the seal fluid in addition to the test fluid. Although recycling of the test gas is generally not desirable due to possible contamination, it is desirable to recapture and recycle the seal gas, which comprises a relatively much larger volume. This could be done by completely bleeding off the pressure in the seal gas supply line and tester body and routing the bled-off gas to a reclamation tank. A disadvantage of that procedure is that the time used in re-pressuring the entire supply line (comprising most of the seal gas pressurized volume) and tester body to the desired seal pressure is quite lengthy, greatly increasing test time and associated costs; this is a key problem presented by prior art test tools.

Another problem exists with prior art test tools. The seal elements are typically doughnut-shaped elements of a resilient material, generally a rubber compound. In their relaxed condition, the maximum outer diameter of the elements is somewhat less than the inner diameter of the tubular. As the pistons on the tester body are forced against the seal elements by the seal gas pressure, the elements are squeezed and deform outward, forming a seal against the tubular wall. However, with current tools, there is no positive limit on the distance that the pistons can travel; that is, if excessive seal gas pressure is applied, the pistons will move too far and will damage the seal elements, requiring repair of the tool with the resulting lost time cost. The present invention solves this problem. The pistons have an extended neck which extends through the central hole in the seals into an annular cavity formed by the body of the tool and retaining flanges on the tool. The length of the piston neck and cavity positively limits the distance that the pistons can travel, regardless of the applied pressure, and thus excessive deformation of the seals is prevented.

Loomis, U.S. Pat. No. 2,731,827 (Jan. 24, 1956); Loomis, U.S. Pat. No. 2,841,007 (Jul. 1, 1958); Loomis, U.S. Pat. No. 3,038,542 (Jun. 12, 1962); Loomis, U.S. Pat. No. 3,154,940 (Nov. 3, 1964); and Loomis, U.S. Pat. No. 3,165,918 (Jan. 19, 1965) all disclose conventional tubular connection testers without means of retaining seal fluid line pressure, and without means of preventing seal piston overtravel. Loomis, U.S. Pat. No. 3,165,919 (Jan. 19, 1965), and Loomis, U.S. Pat. No. 3,165,920 (Jan. 19, 1965), show separate seal and test fluid lines, but with pressure controls only remote from the tester body, and without the ability to retain seal line pressure between tests; further, seal piston overtravel is not prevented. Loomis, U.S. Pat. No. 3,199,598 (Aug. 10, 1965) teaches an apparatus for testing and repairing well pipes without means to retain seal fluid pressure. Pate, U.S. Pat. No. 4,852,393 (Aug. 1, 1989) discloses a pipe tube pressure tester.

None of these patents disclose the present invention. The prior art does not solve the time and related cost problems associated with gas pressure testing of tubular connections, and does not solve the problem of excessive piston travel and resulting seal damage from intentional or accidental excessive seal pressure. The prior art does not disclose an apparatus for testing the pressure integrity of tubulars with gas which:

- retains and recycles a substantial part of the seal gas so as to reduce gas costs;
- maintains the seal gas supply line in a pressurized state between tests, thereby reducing test cycle time; and
- positively limits travel of the tester body pistons regardless of the seal pressure applied to the pistons, thereby preventing damage to the seal elements caused by excessive piston travel.

This invention permits the testing operator to optimize the cost balance between the time saved between tests (increased time savings with a higher retained seal gas supply line pressure) and the volume of seal gas vented (increased volume savings with a lower retained seal gas supply line pressure).

OBJECTS OF THE INVENTION

An object of the present invention is to provide an improved means for conducting internal tubular connection pressure testing. Another object of the invention is to provide a means for retaining and recycling seal gas, which is commonly an expensive noble gas such as helium, thereby saving the cost of the gas.

Another object of the invention is to provide a means for maintaining the seal gas supply line in a pressurized state between pressure tests, thereby greatly reducing the pressure cycle time and saving time-dependent costs.

Yet another object of the invention is to provide a means for positively limiting travel of the seal-expanding pistons on the tester body, preventing damage to the seal elements caused by excessive piston force, and thereby reducing the frequency and cost of seal element repair and replacement.

SUMMARY

The apparatus for pressure testing of tubulars, in particular internally pressure testing tubular connections with gas, according to the present invention, is characterized by a generally cylindrical tester body having multiple external circumferential seal elements expansible against the tubular walls by means of pistons, thereby forming a test chamber; means for introducing and releasing test gas into and out of the test chamber; means for applying and releasing seal gas pressure to and from the actuating pistons so as to expand the pack-off seal elements, said means including a seal gas saver valve means for retaining a desired pressure within the seal gas supply line, while permitting complete depressurization of the tester body and pistons and complete release and retraction of the pack-off elements.

The tester body is inserted into a tubular, with the seal elements typically but not necessarily positioned astride a tubular connection. Seal gas pressure is applied to move the actuating pistons and expand the seal elements against the tubular walls. A test chamber is thereby created, defined by the upper and lower seal elements, the inner tubular wall, and the tester body. Excessive piston travel is prevented by an inner neck on the pistons contacting a retaining flange on the tester body. A test gas such as helium is introduced into the test chamber through a test gas supply line so as to create a desired test pressure. The test pressure can then be held as long as required while an external electronic sensing means is used to detect any escape of gas, thereby showing a leak. The external sensing means comprises a sleeve-like capture means which surrounds the exterior of the tubular and has circumferential upper and lower seals, the capture means positioned on the tubular so as to cover substantially the same interval as the tester body to capture any test gas leaking through the tubular connection. A mass spectrometer tests the capture means volume to detect any test gas leak. When the test is completed, the test gas pressure is released completely by venting to atmosphere. The seal gas pressure is then decreased, with the seal gas flowing back into a reclamation tank for recycling, until the seal gas line pressure drops to a desired level. At that level, the seal gas saver valve closes, maintaining seal gas line pressure at the desired retention pressure. The small remaining seal gas volume in the tester body below the seal gas saver valve is vented to atmosphere, the seal elements retract and the tool can be moved to a new position.

BRIEF DESCRIPTION OF THE DRAWINGS

FIG. 1 further shows the pressurized test and seal gas supply source, the reclamation tank into which the seal gas flows following a test, and the seal and test gas supply lines. Also, FIG. 1 shows in cross section the seal gas saver valve at the upper end of the tester and the seal piston assemblies.

DESCRIPTION OF THE PREFERRED EMBODIMENT

The present invention has three main components: a tester body having multiple spaced-apart external circumferential seal elements, expansible by means of pistons driven by a seal gas pressure, with piston travel limited by an internal piston sleeve and retaining flanges on the tester body; a seal gas supply means comprising a seal gas saver valve means; and a pressurized seal and test gas source. An external test gas containment and sensing means is typically employed with the present invention to detect leaks.

Figure 1:
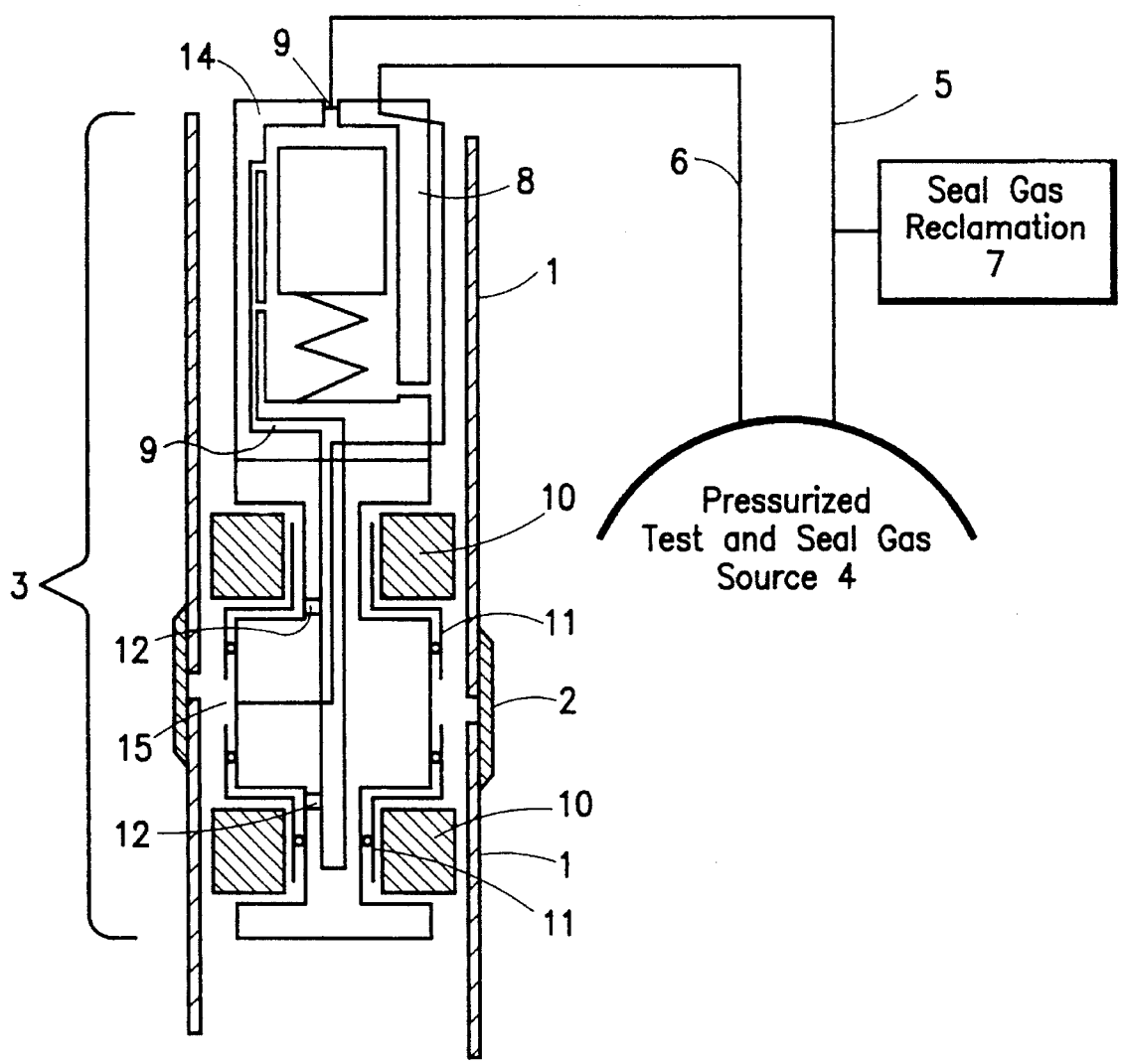
FIG. 1 is a schematic view of the tester apparatus, before seal gas pressure is applied and the seal elements expanded, including a cross-section schematic of a typical tubular connection showing the tester body in place with the seal elements expanded and straddling the tubular connection.
Figure 2:
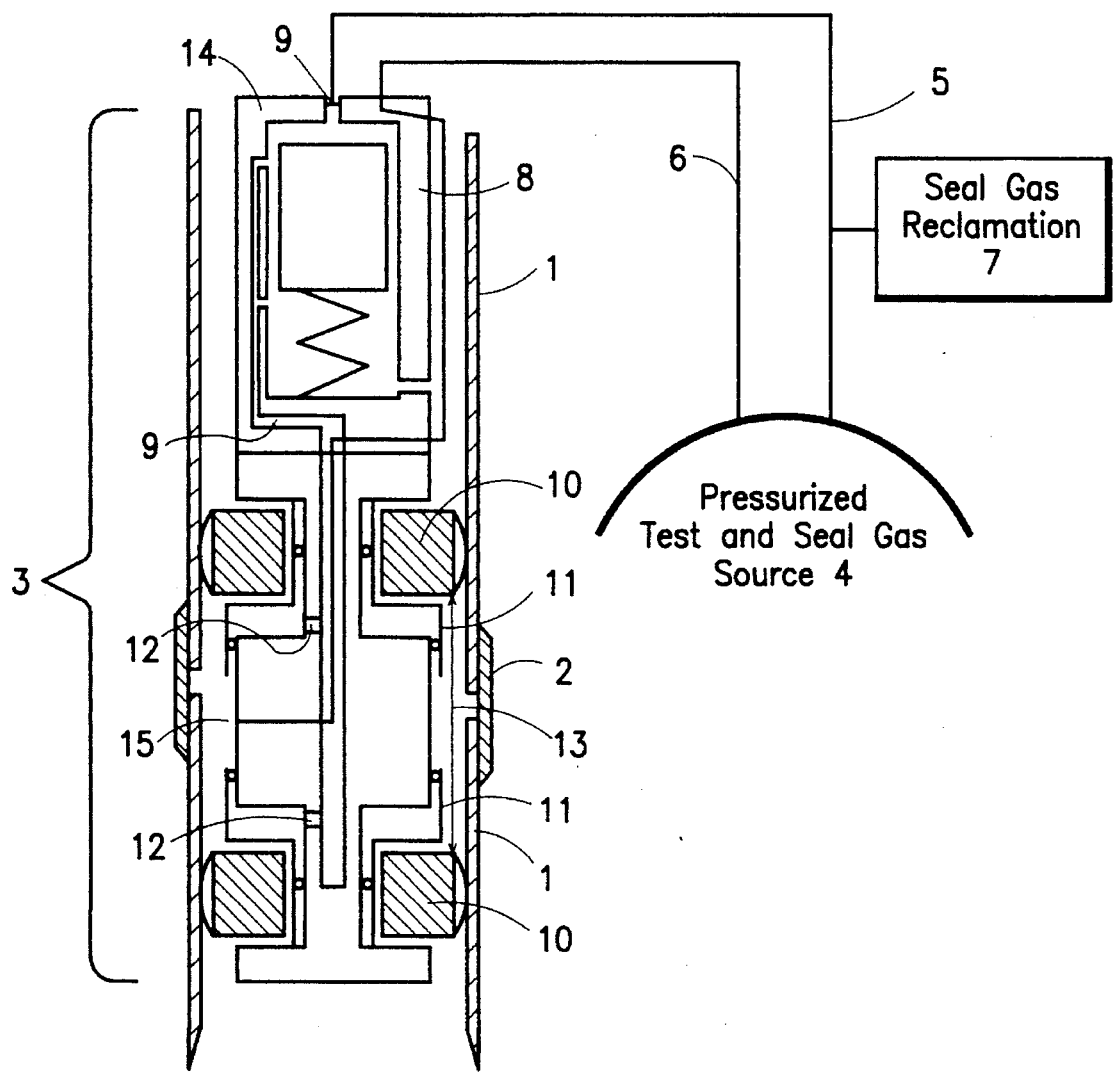
FIG. 2 is a cross-section schematic of the apparatus with the seal elements expanded against the tubing wall, creating the pressure test chamber.
Figure 5:
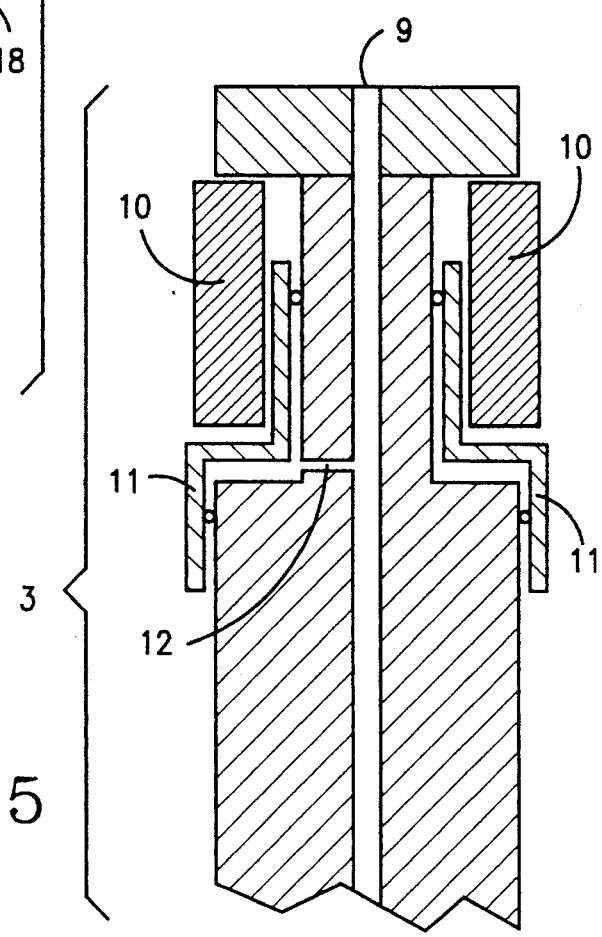
FIG. 5 is a detailed cross-section schematic of the tester body, showing the upper piston and seal assembly, and showing in particular the inner piston neck assembly and the inner chamber in which it travels.

While there may be many embodiments of the apparatus for testing the pressure integrity of tubular goods, with reference to FIGS. 1, 2, 3, and 5 one embodiment is described below. In FIG. 1, the tester body and seal gas saver valve assembly, 3, is positioned within a tubular, typically with the seal elements 10 on either side of a tubular connection shown as a threaded collar 2 joining tubular bodies 1. However, other types of connections, such as snap-latch connections, could be tested as well. Further, the apparatus could also be used to test the body or tube of a tubular good in addition to or instead of testing the tubular connection. With the tester body 3 in the desired position, pressurized gas source 4 supplies seal gas to the apparatus 3 through line 5. When a selected seal gas supply line retention pressure is reached, seal gas saver valve 8 (shown in further detail in FIG. 3) opens and permits seal gas to flow through channel 9 to a lower portion of the tester body 3, shown in greater detail in FIG. 5, comprising the seals 10 and operating pistons 11 (only the top set of seals 10 and upper piston 11 is shown in FIG. 5, while it is understood that the apparatus includes a lower piston and seal assembly, as shown in FIGS. 1 and 2). The seal gas saver valve 8 operation is described in further detail below. With reference to FIG. 5, showing the upper piston and seal assembly, seal gas then flows through channel 9 to the pressure surfaces of pistons 11 through port 12. Seal gas pressure drives pistons 11 along the longitudinal axis of the tester body 3, in turn compressing seal elements 10. Seal gas pressure is increased to a desired setting pressure. Seal elements 10 expand outwardly in response to the piston compression forces and seal against the inner tubular wall, as in FIG. 2. In this manner, a test chamber 13 is defined by the upper and lower seal elements 10, the inner tubular wall, and the tester body. Once the seal elements are set, the seal pressure is maintained at the desired seal pressure.

The desired test pressure is then applied to the test chamber. Pressurized test gas source 4 supplies test gas at a desired test pressure through a line 6 to the apparatus, as shown in FIGS. 1 and 2. As shown in FIGS. 1 and 2, test gas supply line 6 then runs to an outlet mandrel 14 above seal gas saver valve 8, exiting the channel 9, and reentering seal gas supply channel 9 below seal gas saver valve 8. With reference to FIGS. 1,2, and 5, test gas supply line 6 continues through seal gas supply channel 9 to port 15 and then into the test chamber 13. Test pressure is then held at the desired level.

An external test gas containment means, not shown, is placed around the outside of the tubular, sealing around the tubular with upper and lower seals. Any escaping test gas is then contained within this containment means, and any test gas presence is noted by a mass spectrometer which detects the presence of a noble test gas, such as helium, in very low concentrations.

At the completion of the pressure test, the test gas pressure is then released by bleeding the pressure off through the test gas supply line, 6, down to atmospheric pressure. When the test gas pressure has been completely released, the seal gas pressure may be decreased through the seal gas supply line, 5, by a valve means (not shown) with the seal gas flowing back into reclamation tank 7. When the desired seal gas supply line retention pressure is reached, the seal gas saver valve 8 closes, maintaining the pressure in line 5 at the retention pressure and venting the small remaining seal gas volume in the tester body to atmosphere. With the seal gas pressure force removed from pistons 11, seal elements 10 return to their relaxed position away from the tubular walls, as in FIG. 1, releasing the tester body to be moved to another desired position.

Figure 3:
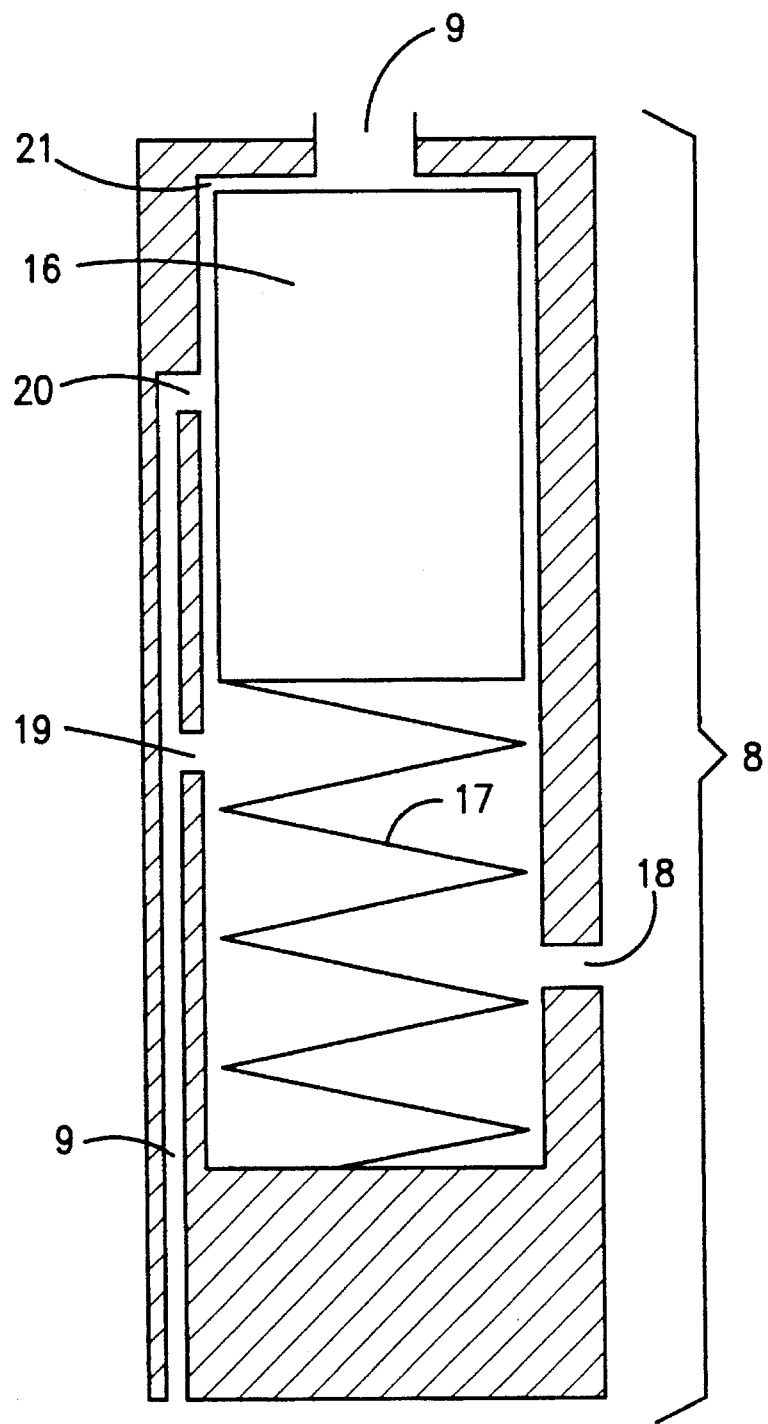
FIG. 3 is a detailed cross-section schematic of one embodiment of the seal gas saver valve assembly.

With reference to FIG. 3, the seal gas saver valve 8 operation is now detailed. With the tester body in a desired position to carry out a pressure test, as in FIG. 1, the piston 16, travelling sealingly within the piston cylinder 21, is initially in an upper position, with the tester body and seal piston assembly vented to atmosphere via channel 9, port 19, piston cylinder 21, and atmospheric vent 18. Seal gas pressure is then increased toward a desired retention pressure, being the pressure at which the valve piston shifts and at which the seal gas supply line will be maintained between tests. Although this retention pressure will vary depending upon the conditions, 3000 psi is a representative pressure. Spring 17 exerts an upward force on seal gas saver valve piston 16 equal to the downward force on piston 16 exerted by the seal line retention pressure. When the pressure reaches the retention pressure value, the pressure force overcomes the spring force, and the piston 16 moves downward, first closing port 19 and isolating channel 9 and the seal pistons from atmospheric pressure. In response to increasing seal gas pressure, piston 16 continues to move downward, exposing port 20 to seal gas pressure. Seal gas pressure then flows through channel 9 to the pistons 11. Pistons 11 move in response to the seal gas pressure, squeezing seal elements 10 outward as described above. Seal gas pressure is then increased to a desired maximum seal pressure, with 5000 psi being a representative value, and maintained at that pressure for the duration of the test.

When the test is complete, and after the test gas pressure has been reduced to atmospheric pressure, seal gas supply line pressure is reduced, with seal gas flowing through channel 9 and supply line 5 into reclamation tank 7. When the seal gas supply line pressure is reduced to the retention pressure, piston 16 is forced upward by spring 17, first sealing port 20 from the supply line pressure. Supply line 5 pressure is then maintained at the retention pressure value. Further travel by piston 16 opens port 19, establishing an atmospheric vent path for pressure below seal gas saver valve 8 through the piston cylinder 21 and out atmospheric vent 18. With the seal gas pressure vented and the seal piston forces removed, the seal elements return to their relaxed position, as in FIG. 1, and the tester body can be moved.

FIG. 3 shows the preferred embodiment of the seal gas saver valve.

Figure 4:
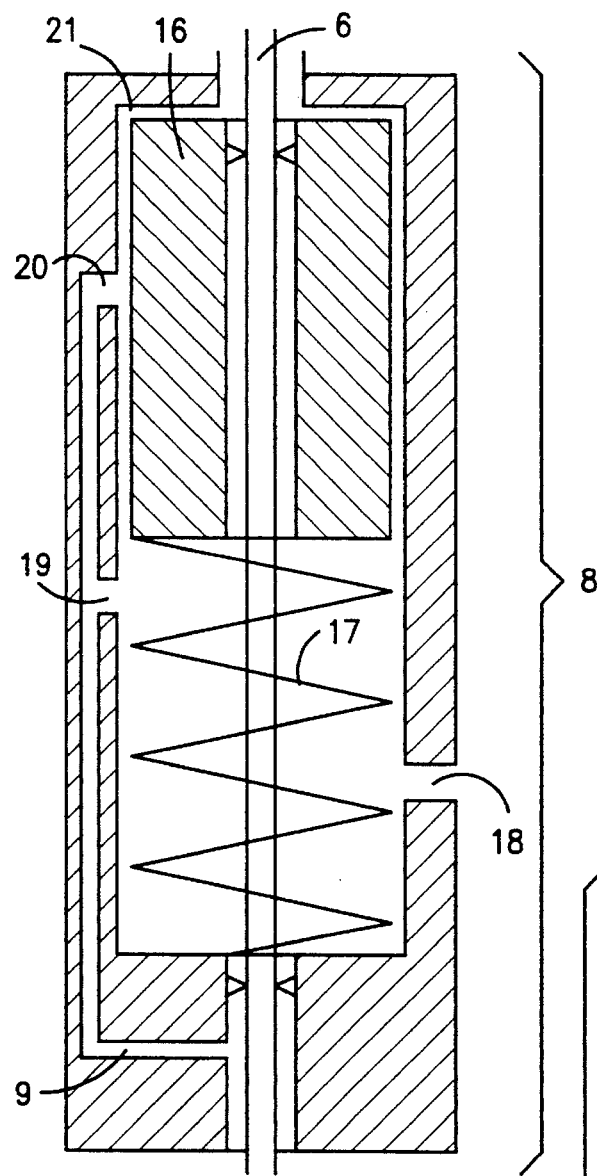
FIG. 4 is a detailed cross-section schematic of another embodiment of the seal gas saver valve assembly.

FIG. 4 shows an alternative embodiment of the seal gas saver valve, with the test gas supply line 6 routed through the valve.

Another embodiment of the supply gas saver valve 8 (not shown) employs an additional line connected to the supply gas atmospheric vent, 18, by which additional seal gas could be reclaimed and recycled for use by capturing it at a low pressure.

Another embodiment of the apparatus (not shown) includes a second retention valve on the test gas line, thereby permitting retention of the test gas line pressure at a desired value, by operation similar to the seal gas saver valve described above on the seal gas line.

Another embodiment of the apparatus (not shown) expands the seal elements directly by applying seal gas to the inner surface of the seal elements, without the use of pistons.

Various other uses and modifications of the present invention will occur to those skilled in the art. For example, the invention could be employed to test tubular bodies as well as connections. Accordingly, the foregoing description should be regarded as only illustrative of the invention, whose full scope is measured by the following claims.

I claim:

1. An apparatus for forming a test chamber within tubulars with a seal gas, internally pressure testing said tubulars with a test gas, and for recycling a substantial portion of said seal gas, comprising:

a generally cylindrical tester body having two or more spaced-apart external circumferential resilient seal elements, said tester body forming a test chamber when placed in a desired position within a tubular with said seal elements expanded sealingly against a tubular wall;

a pressurized test gas source;

means for supplying said pressurized test gas to said test chamber;

expanding means cooperatively attached to said tester body, responsive to a seal gas pressure, for expanding said seal elements;

a pressurized seal gas source; and means for supplying said pressurized seal gas to said expanding means, expanding said seal elements thereby, and for withdrawing said seal gas from said expanding means, retracting said seal elements thereby, said supply means further comprising a seal gas saver valve means, attached to said tester body, said valve means having piston means and spring means therein, said spring means biasing said piston means toward a first position for sealing said seal as supply means and opening said expanding means to an atmospheric vent when said seal gas pressure is below said retention pressure and said piston means moving to a second position for permitting said seal gas to flow to said expanding means when said seal gas pressure is above a desired retention pressure.

2. The apparatus of claim 1, wherein said expanding means comprises two or more pistons, concentric with and moving axially on said tester body in response to said seal gas pressure, said pistons axially compressing said seal elements and outwardly expanding said seal elements to seal against said tubular wall when said seal gas pressure is applied.

3. The apparatus of claim 2, wherein said pistons comprise an extended internal neck portion proximal to said tester body; and said tester body comprises a pair of internal shoulders, for contacting said neck portions of said pistons, limiting movement of said pistons thereby.

4. The apparatus of claim 1, wherein said seal gas saver valve means comprises:

a generally cylindrical body, said body having a cylindrical piston chamber with a seal gas supply opening and an atmospheric vent opening, said body further having a seal gas channel having inlet and outlet ports connecting said channel to said piston chamber; and wherein said spring is disposed within said chamber for biasing said piston therein; and said piston travels sealingly within said chamber between said first and second positions, said piston responsive to said seal gas pressure and said spring, said spring urging said piston into said first position when said seal gas pressure is below said retention pressure, said piston sealing said seal gas supply opening and said seal gas channel inlet port and opening said seal gas channel outlet port, venting said expanding means to said atmospheric vent thereby, said seal gas pressure moving said piston to said second position when said seal gas pressure is greater than said retention pressure, said piston sealing said seal gas channel outlet port and opening said seal gas channel inlet port, permitting said seal gas to travel to said expanding means thereby.

5. The apparatus of claim 4, wherein said test gas supply means comprises a conduit running centrally through said seal gas saver valve means.

6. An apparatus for forming a test chamber within tubulars with a seal gas, internally pressure testing said tubulars with a test gas, and for recycling a substantial portion of said seal gas, comprising:

an elongated mandrel having first and second ends;

retaining flanges disposed on said first and second ends of said mandrel;

first and second sleeve-like pistons slidably disposed upon said first and second ends of said mandrel, said pistons having extended forward neck portions with a reduced diameter;

upper and lower piston seals disposed within said first piston for forming a chamber under said first piston, said first piston movably responsive to a seal gas pressure within said chamber, said first piston movement limited by contact of said neck portion with said first retaining flange;

upper and lower piston seals disposed within said second piston for forming a chamber under said second piston, said second piston movably responsive to a seal gas pressure within said chamber, said second piston movement limited by contact of said neck portion with said second retaining flange;

a first seal element comprising a resilient doughnut-shaped body, disposed upon said mandrel between said first piston and said first retaining flange, said neck portion of said first piston moving through a central hole in said seal element;

a second seal element comprising a resilient doughnut-shaped body, disposed upon said mandrel between said second piston and said second retaining flange, said neck portion of said second piston moving through a central hole in said seal element;

a pressurized test gas source;

means for supplying said pressurized test gas to said test chamber;

a pressurized seal gas source; and means for supplying said pressurized seal gas to said first and second piston pressure chambers, forcing said pistons against said seal elements and expanding said seal elements into sealing contact with a tubular wall, forming a test chamber thereby, and for withdrawing seal gas from said piston chambers, retracting said seal elements thereby, said supply means further comprising a seal gas saver valve means connected cooperatively to said mandrel, said valve means comprising:

a generally cylindrical body, said body having a cylindrical piston cylinder with a seal gas supply opening and an atmospheric vent opening, said body further having a seal gas channel having inlet and outlet ports connecting said channel to said piston cylinder;

a spring disposed within said cylinder for biasing a piston therein;

a piston traveling sealingly within said cylinder between first and second positions, said piston responsive to said seal gas pressure and said spring, said spring urging said piston into said first position when said seal gas pressure is below a desired retention pressure, said piston sealing said seal gas supply opening and said seal gas channel inlet port and opening said seal gas channel outlet port, venting said expanding means to said atmospheric vent thereby, said seal gas pressure moving said piston to said second position when said seal gas pressure is greater than said retention pressure, said piston sealing said seal gas channel outlet port and opening said seal gas channel inlet port, permitting said seal gas to travel to said first and second piston pressure chambers, driving said pistons and expanding said seal elements thereby.

7. The apparatus of claim 6, wherein said means for supplying said test gas to said test chamber comprises a conduit disposed externally to said seal gas saver valve means and substantially centrally within said mandrel.

8. The apparatus of claim 6, wherein said means for supplying said test gas to said test chamber comprises a conduit disposed substantially centrally within said mandrel and said seal gas saver valve means.

9. The apparatus of claim 8, wherein said seal gas saver valve means comprises:

a generally cylindrical body, said body having a cylindrical piston cylinder with a seal gas supply opening and an atmospheric vent opening, said body further having a seal gas channel having inlet and outlet ports connecting said channel to said piston cylinder and a lower central hole for passage of said test gas conduit;

a seal disposed within said lower central hole for sealing said conduit within said hole;

a spring disposed within said cylinder for biasing a piston therein;

a piston traveling sealingly within said cylinder between first and second positions, said piston responsive to said seal gas pressure and said spring, said spring urging said piston into said first position when said seal gas pressure is below a desired retention pressure, said piston sealing said seal gas supply opening and said seal gas channel inlet port and opening said seal gas channel outlet port, venting said expanding means to said atmospheric vent thereby, said seal gas pressure moving said piston to said second position when said seal gas pressure is greater than said retention pressure, said piston sealing said seal gas channel outlet port and opening said seal gas channel inlet port, permitting said seal gas to travel to said first and second piston chambers, driving said pistons and expanding said seal elements thereby, said piston further having a central concentric hole therein for passage of said test gas conduit; and a seal disposed within said central piston hole, providing sliding sealing contact between said conduit and said piston.

* * * * *